July 14, 1953
R. H. RIDNOUR
2,645,092
ICE CUBE VENDING MACHINE
Filed Aug. 2, 1950
5 Sheets-Sheet 1
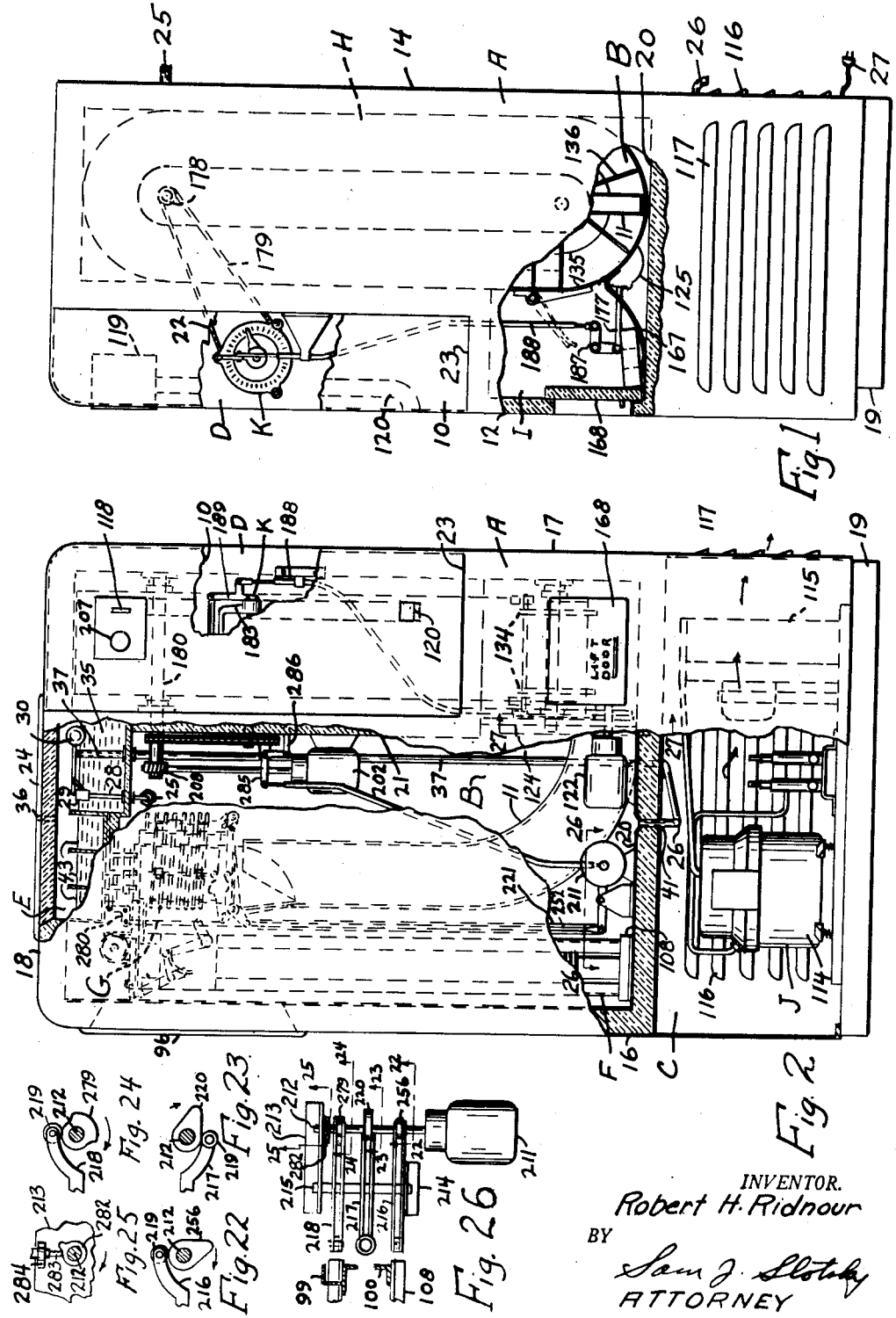
INVENTOR.
Robert H. Ridnour
BY
Sam J. Slotsky
ATTORNEY July 14, 1953
R. H. RIDNOUR
2,645,092
ICE CUBE VENDING MACHINE
Filed Aug. 2, 1950
5 Sheets—Sheet 2
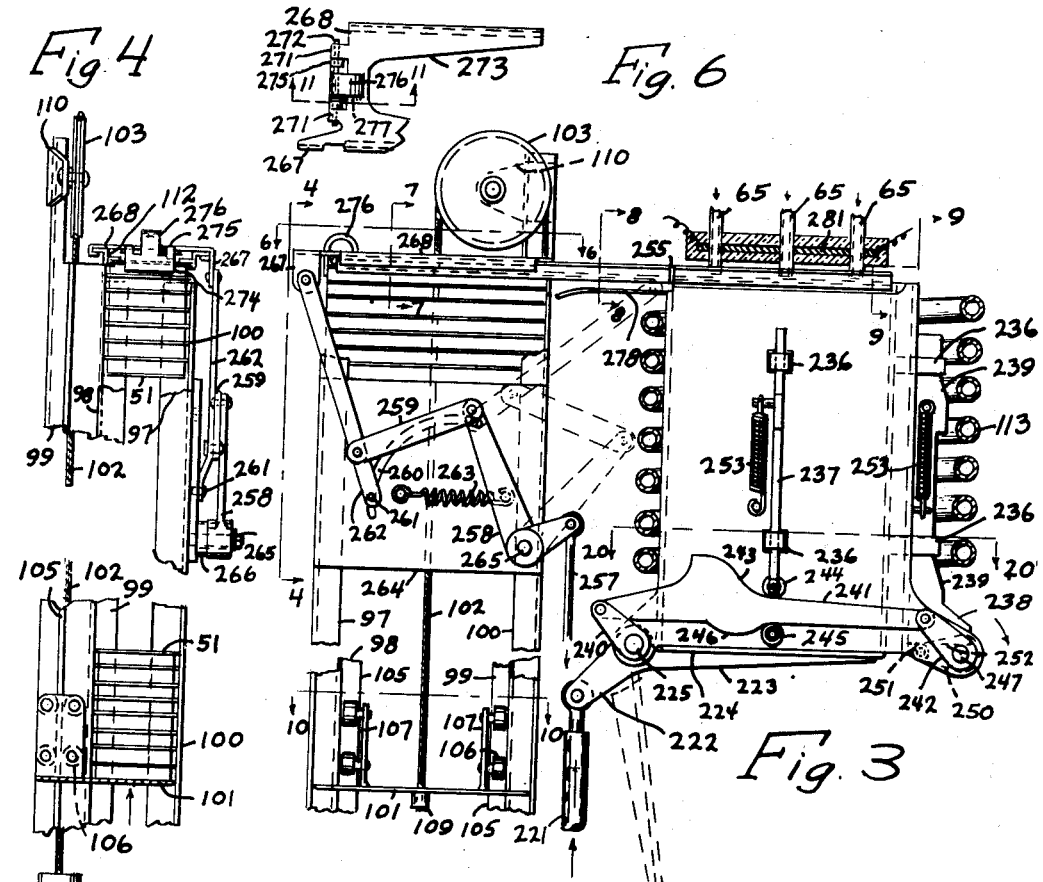
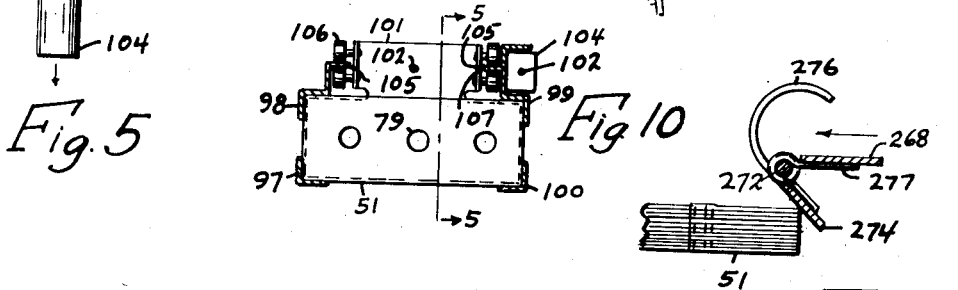
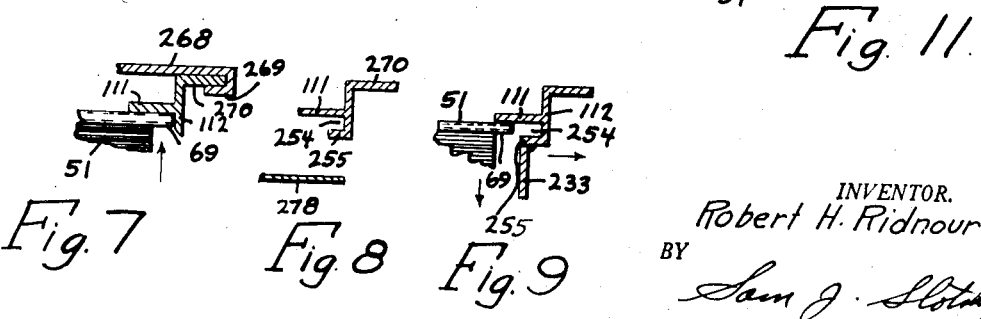
INVENTOR.
Robert H. Ridnour
BY
Sam J. Slotky
ATTORNEY July 14, 1953 R. H. RIDNOUR 2,645,092
ICE CUBE VENDING MACHINE
Filed Aug. 2, 1950 5 Sheets-Sheet 3
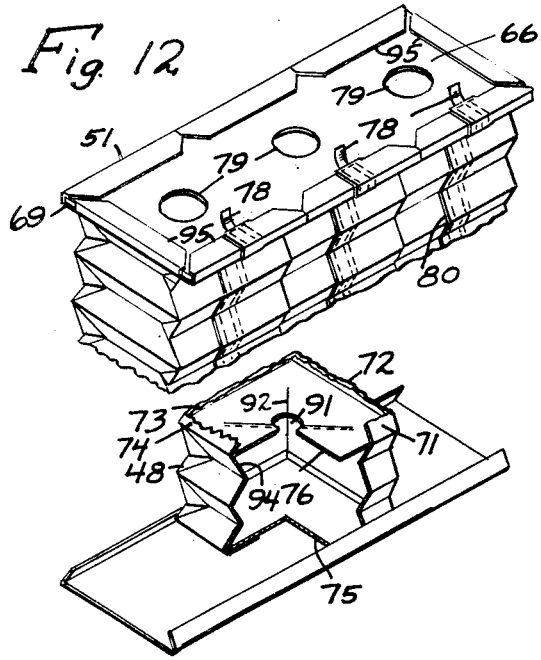
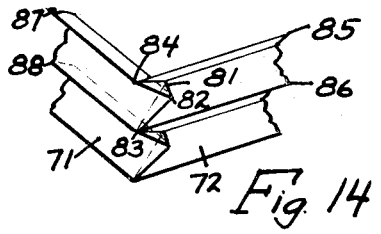
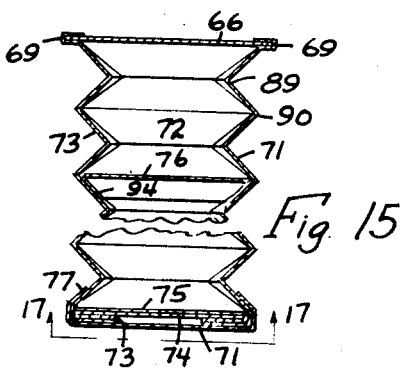
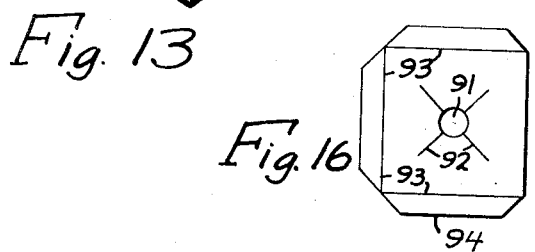
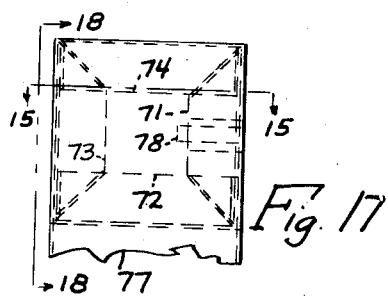
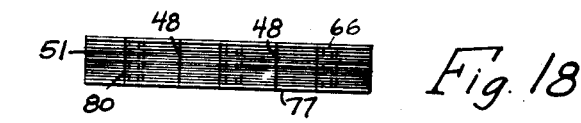
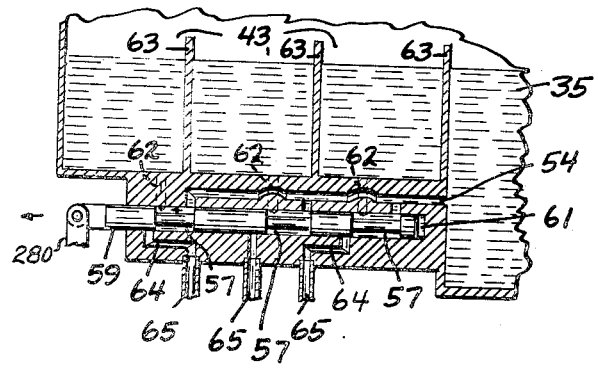
INVENTOR.
Robert H. Ridnour
BY
Sam J. Slotsky
ATTORNEY

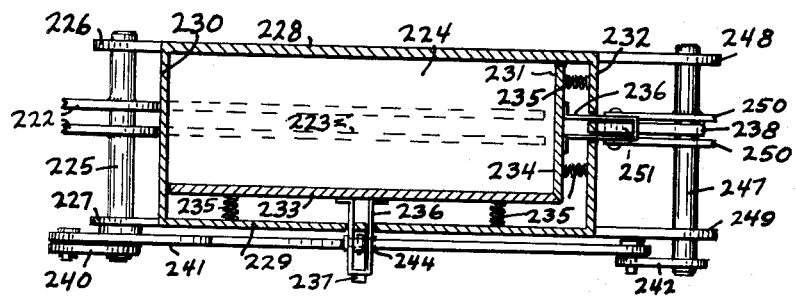
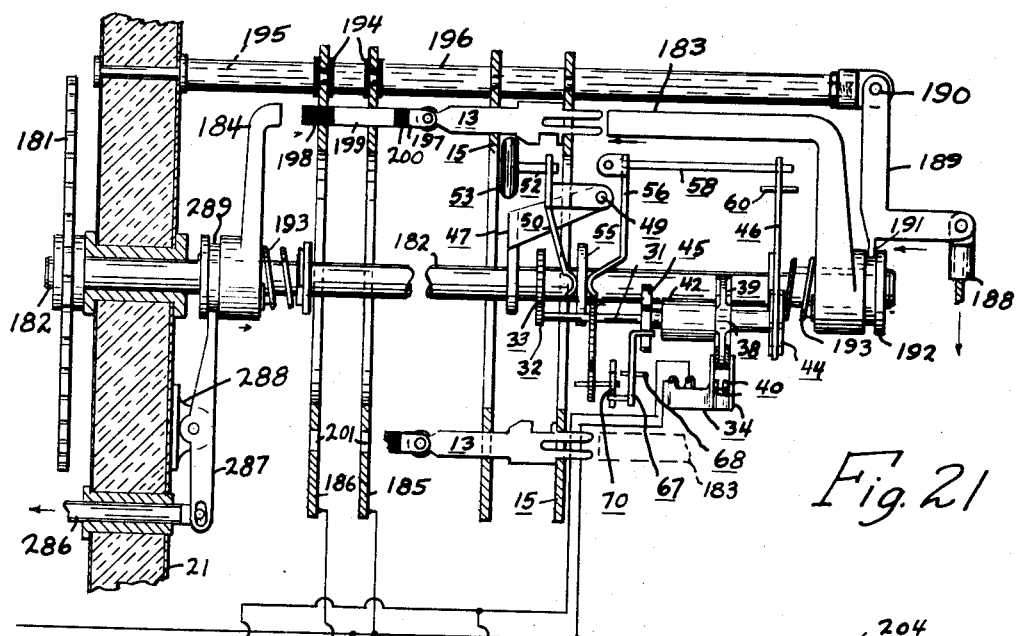
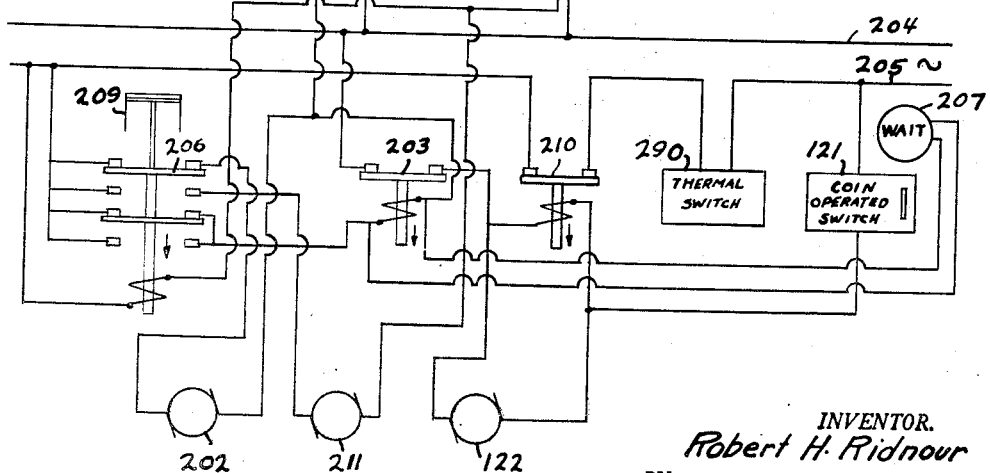

July 14, 1953 R. H. RIDNOUR 2,645,092
ICE CUBE VENDING MACHINE
Filed Aug. 2, 1950 5 Sheets-Sheet 5
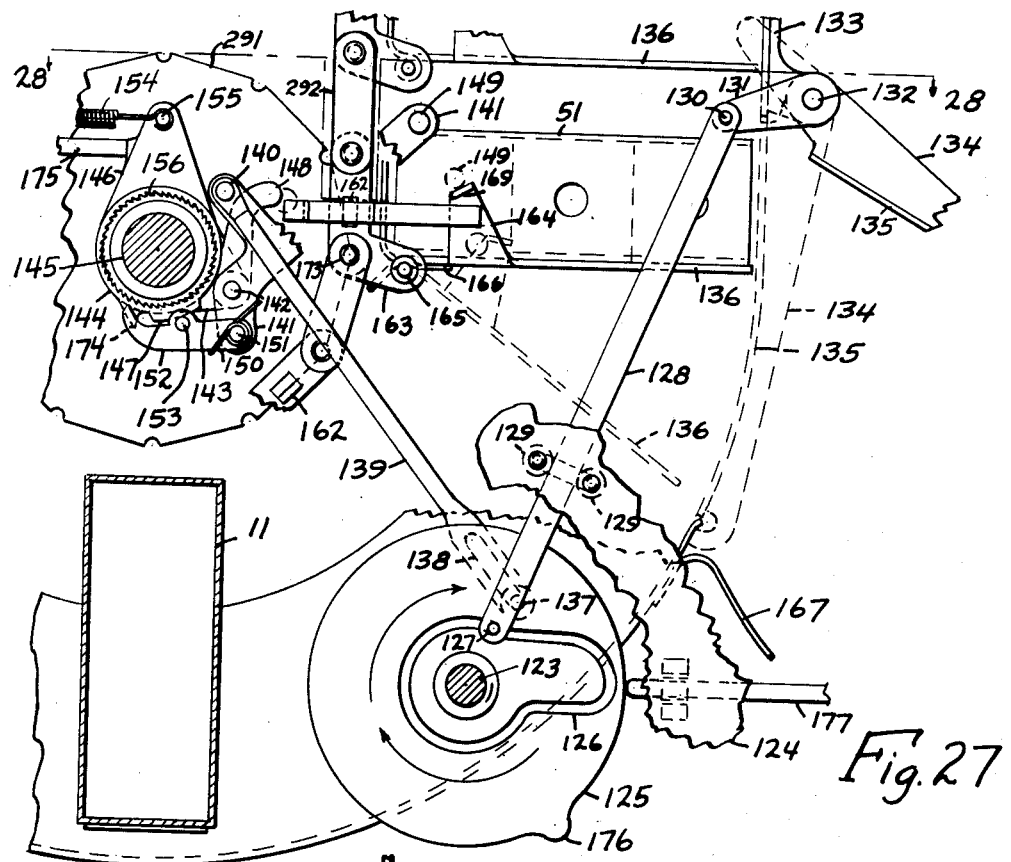
Fig. 27
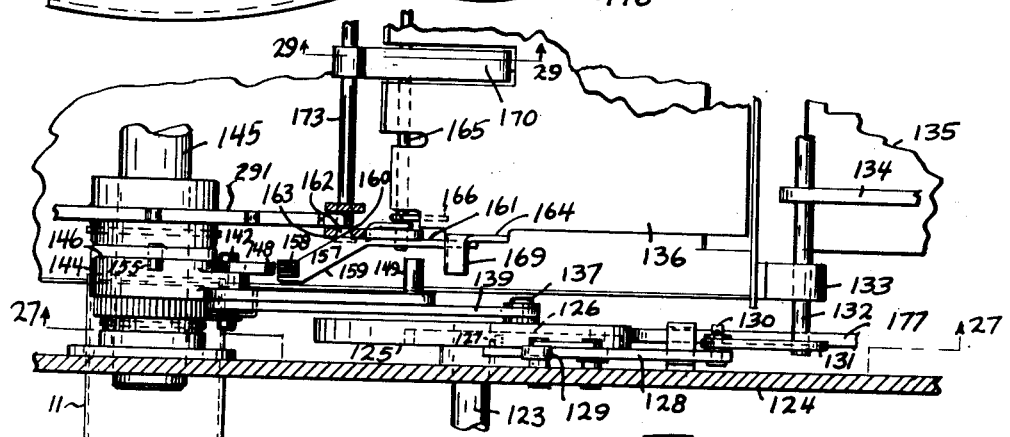
Fig. 28
Fig. 29
INVENTOR.
Robert H. Ridnour
BY
Sam J. Slotky
ATTORNEY Patented July 14, 1953

2,645,092

UNITED STATES PATENT OFFICE 2,645,092

ICE CUBE VENDING MACHINE

Robert H. Ridnour, Sioux City, Iowa

Application August 2, 1950, Serial No. 177,299

3 Claims. (Cl. 62—2)

My invention relates to an ice cube vending machine.

An object of my invention is to provide an ice cube vending machine in which the ice cubes will be dispensed in the form of packaged units, which packaged units can be readily opened.

A further object of my invention is to provide a coin operated vending machine which will operate automatically upon the insertion of a coin, and with attendant means so arranged that the freezing cycle in the machine must be completed before a package will be released, thereby providing a machine that will function without error.

A further object of my invention is to provide an arrangement wherein the packaged ice cubes are formed within initially collapsed folded containers which become extended due to the automatic control and flow of water therein, the water supply to the machine being constant at all times.

A further object of my invention is to provide means whereby the water admitted to the frozen cube containing elements is accurately measured, and to provide further attendant means wherein the freezing compartments of the machine will contain and release the packaged ice cubes automatically.

A further object of my invention is to provide an electric control circuit in combination with the various portions of the mechanism of the machine wherein the various packages are moved into position automatically upon the insertion of a coin, and with such electric circuit further providing means for controlling the discharge of the packaged cubes.

A further object of my invention is to provide a machine of this character which will meet a high rate of demand at any hour of the day, due to the automatically functioning arrangements.

A further object of my invention is to provide an arrangement in which the collapsed package units can be readily inserted and which will automatically be guided into the freezing portions of the arrangement.

A further object of my invention is to provide mechanically operated control members to provide all of the aforementioned objects.

A further object of my invention is to provide a machine which will function automatically at all times, requiring servicing only at rare intervals.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation of the complete machine cut away to show the relationship of certain features, Figure 2 is a front elevation of the complete machine cut away to show the relationship of certain features, Figure 3 is a detailed view of the package magazine, package feeding mechanism and freezing compartment, Figure 4 is a side view taken along the lines 4—4 of Figure 3 showing further details of the package magazine and package feeding mechanism, Figure 5 is a section taken along the lines 5—5 showing the package follower carriage, Figure 6 is a view taken along the lines 6—6 of Figure 3 showing the package feeding carriage, Figure 7 is a section taken along the lines 7—7 of Figure 3 through the package feeding carriage and package feed guides, Figure 8 is a section taken along the lines 8—8 of Figure 3 through the package feed guides, Figure 9 is a view taken along the lines 9—9 of Figure 3 through the package feed guide and package retaining wall of the freezing compartment, Figure 10 is a section taken along the lines 10—10 of Figure 3 through the package magazine guide rails, Figure 11 is a detail of the package feed follower, Figure 12 is an isometric cutaway view of the upper portion of the package unit partially extended, Figure 13 is an isometric cutaway view of the lower part of the package unit, Figure 14 is a detail of the corner fold of the package unit, Figure 15 is a section through the package unit at the lines 15—15 of Figure 17, Figure 16 is a flat pattern view of a cube cell separator, Figure 17 is a bottom view taken at line 17—17 of Figure 15 showing the folding details of the package unit bottom, Figure 18 is a side view of the package unit completely collapsed, Figure 19 is a sectional view through the fluid storage and measuring compartments and valve arrangement, Figure 20 is a section taken at line 20—20 on Figure 3 through the freezing compartment, Figure 21 is a detail of the selector mechanism and basic wiring diagram of the machine, Figures 22, 23, 24 and 25 are cam details taken at 22—22, 23—23, 24—24, and 25—25 respectively, of Figure 26, Figure 26 is a plan view taken at line 26—26 on Figure 2 of the package dump-reload cam system, Figure 27 is a detail view taken at line 27—27 on Figure 2 of the package delivery mechanism, Figure 28 is a section taken at 28—28 on Figure 27 showing a plan view of the package delivery mechanism, and Figure 29 is a detail of the package ejector bar taken at line 29—29 of Figure 28.

My invention, of which the machine herein described is only one embodiment, may have many uses. Whereas this embodiment is designed to produce ice cubes for the purpose of cooling beverages, other contemplated uses do not restrict my invention to machines of the size shown or to compartmented packages. Frozen products to be manufactured and vended therein could be cake ice, or by the addition of flavorings or the use of other fluids, could be in the form of ice cream bars, popsicles, or other frozen confections.

While the following detailed specification deals particularly with a machine for making ice cubes, I do not intend to exclude such modifications of the machine as may be required to produce the items above mentioned or which may fall within the broad concepts of my invention.

The machine, as contemplated, may be said to comprise a housing or cabinet A, compartmented into four basic zones: a main refrigerated zone B (Figure 2); a non-refrigerated zone C (Figure 2) at the base of the machine which houses the refrigerating apparatus; a non-refrigerated zone D, having an access cover 10, which zone houses most of the control apparatus; and a semi-refrigerated area E which comprises a receiving means and pre-chilling and measuring compartment for the water; a package storage magazine F, means for feeding packages into a freezing compartment G, a chute or other means 11 for delivery of a frozen package to a reserve storage compartment H which is contained in the refrigerated zone B, and a means for delivery of a frozen package from said storage compartment to a receiving compartment I, together with refrigerating means J, and selector and control means K and other necessary mechanisms hereinafter more fully set forth and described.

The cabinet A may comprise a box-like housing having a front wall 12, a rear wall 14, side walls 16 and 17, top wall 18, and resting on a base 19. The structure of the cabinet walls is such as is conventional for ice-making machines and accordingly, suitable heat insulation is provided to divide the various zones as described above. Refrigerated zone B is further defined by a bottom wall 20 and inset side and front walls 21 and 22 and a horizontal wall 23, which latter three walls also form, together with cover 10, the control zone D. The aforementioned zone C is defined by uninsulated downward extensions of walls 12, 14, 16 and 17, the base 19 and the horizontal wall 20. The semi-refrigerated zone E comprises a removable cover 24 as its upper wall, and suitable side and bottom walls which are heat insulated to prevent the freezing of the water stored therein but which insulation is thinner or less effective than that of the outer walls, thereby allowing sufficient heat transfer to pre-chill the water but not allow it to freeze. Thermostatically controlled auxiliary heating means may be provided, as will be hereinafter more fully described, to prevent freezing in this area.

Service connections to the machine comprise a water inlet 25, a water drain 26, and an electric supply connection 27.

Water entering from the inlet connection 25 passes through tube 28 to a shut-off valve 29 which is controlled by a float 30, which float allows water to fill the pre-chilling and storage reservoir 35 to a predetermined and adjustable level. A vent 36 is provided in cover 24 to assure free inflow and outflow of water from the reservoir compartment. An over-flow pipe 37 is provided to protect against a malfunction of valve 29. Overflow pipe 37 communicates with drain outlet 26. A drain 41 is also provided for the refrigerated zone B in case the refrigeration apparatus should fail, and drain 41 also communicates with drain outlet 26.

Referring to Figures 2 and 19, the reservoir 35 communicates with measuring compartments 43 which are equal in number to the number of vertical cells 48 (Figure 13) provided in the package unit 51 (Figures 13 and 18) by means of a passage 54 which in turn communicates with annular spaces 57 formed by the reduced diameter portions of the cylindrical valve rod 59 and the cylindrical hole 61 in which said valve rod slides, and thence from said annular spaces 57 into the measuring compartments 43 through passages 62. This flow path is the normal path provided at all times except when the valve 59 is operated to fill a package with water during the re-load cycle. This normal path of flow allows the water in measuring compartments 43, which are separated by walls 63, to rise to the same level as the level of the water in storage compartment 35, thus allowing the quantity of water to be discharged into the packages in the re-load cycle to be adjusted by means of adjusting the float 30. On operation of the cylindrical valve 59 in the direction indicated by the arrow in Figure 19, the annular spaces are moved in such a manner as to close communication with passage 54 and reservoir 35 and uncover openings to passage 64 which communicate with discharge tubes 65, thus allowing the outflow from said measuring compartments of the entire measured quantity of water. The parts and passages of the valve mechanism may be readily proportioned to prevent any direct communication between reservoir 35 and discharge tubes 65. It is contemplated that other means of discharging a measured quantity of water, such as positive displacement pumps, may be provided in lieu of the arrangement shown, all of which means are considered within the scope of my invention.

Having described the water supply system, I will now describe the package unit, and in turn, the storage means for maintaining a supply of packages in proper position to be fed into the freezing compartment.

Referring to Figures 12 and 13, it will be seen that the package contemplated for use in the present embodiment of my invention is a multi-cellular unit which is collapsible to require a minimum of space for storage within the machine, thereby accomplishing one of the objects of my invention. The views of Figures 12 and 13 have been cut away to show the structure of the package, and Figure 13 is shown in shortened relationship to Figure 12, that is, several cells have been removed from the middle of the package, the complete package actually containing five or six vertical divisions, thus forming fifteen to eighteen cube cells. These packages are to be made from suitable materials capable of retaining water, such as wax impregnated paper, metal foil, foil backed by paper, plastic film, or any combination of materials suited to the purpose.

The package comprises a top 66, which is of heavier gauge material than the sides, rectangular in shape, and being wider than the main body of the package, thus forming overhanging lips 69 (Figures 12 and 15) which will presently be seen to be useful in guiding and loading the packages; multiple vertical cells 48 (Figure 13) each having its own four side walls 71, 72, 73 and 74, and bottom diaphragm 75, and containing suitably spaced separators 76; and a bottom tie sheet 77. Rip strips 78 of a tough material may be imbedded into the lap joints 80 of the vertical cells 48 to facilitate the opening of the package in use, and may in fact carry the adhesive in the process of manufacture.

The top 66 has a water inlet opening 79 located over the center of each vertical cell 48 to allow the package to be filled when brought into position under water discharge tubes 65 in the freezing unit.

The vertical cells 48 comprise the side walls 71, 72, 73 and 74, which are formed by folding a flat sheet of suitable material into an essentially tubular form and joining the edges in an ordinary lap joint 80. Said tubular structure is rendered collapsible and extensible along its lengthwise dimension by means of suitably spaced alternate inward folds 89 (see Figure 15) and outward folds 90. The spacing of said inward and outward folds is necessarily an exact fractional part of the vertical length of the desired ice cube size. It will be readily apparent that there may be any number of inward folds per cube. However, it will also be apparent that each fold adds thickness to the package when collapsed and, therefore, it is desirable that a minimum number of folds be used. It is possible to make only one inward fold per cube, but in so doing, the materials of the sides 71, 72, 73 and 75 would meet in the center and tend to block the free flow of water from cell to cell, which we shall presently describe. I have therefore illustrated the preferred form of folding wherein there are two inward folds per cube.

Figure 14 illustrates a detail of the folding at the corners of the tube and is typical of all four corners. It will be seen that the folding of one side, as side 72, differs from the folding of its adjacent side, as 71, in that it is necessary to form additional small triangular surfaces as defined by the corners 81—82—84 and 81—82—83. For convenience of this discussion we will hereafter call a fold as side 71 is folded in Figure 14 a flat fold, and we will call a fold as side 72 is folded a broken fold. These corner folds will be more readily understood by the facts that when viewed in the flat, angles 85—84—81, 84—81—82, 83—81—82, 81—84—82, 82—81—83 and 86—83—81 are all 45-degree angles. Angle 88—83—82, angle 87—84—82, angle 84—82—81 and angle 83—82—81 are all 90-degree angles. I have illustrated the cells 48 as all being flat folded on both corners of opposing sides and broken folded on the alternate sides. However, it is intended that my invention shall not be restricted to such an arrangement but shall include any possible combinations and permutations of such flat folds and broken folds. The vertical cells 48 further comprise horizontal separators 76 which divide the tube into individual cube cells. Separators 76 have a hole 91 preferably located at the center, which allows the downward passage of water when filling the package and which also allows the upward passage of air during filling and bubbles during freezing, as well as allowing the upward expansion of the unfrozen water core which is typical of the process of freezing water in an open-topped container wherein the freezing of ice progresses inwardly.

The separators 76 may also have multiple slits 92 proceeding outwardly for a limited distance from said hole 91, preferably toward the corners of the separator because when so located, they may be longer and still leave a more substantial portion of the diaphragm or separator uncut. The purpose of these slits is to assist in the easy flow of air or water between the individual cube cells, especially during the process of manufacture of the package 51 wherein at certain stages of fabrication on high speed machinery, it will be necessary to rapidly collapse the cells to folded position and a maximum area for the escape of trapped air will be necessary. The tabs comprised by slits 92 and the edge of hole 91 will spring partially open when under pressure of air or water flow and close again when the pressure is relieved.

It will be apparent that when cubes of ice are frozen in such a package, there will be a bond of ice between adjacent cubes. This bond being small in area and centrally located will, by the principles of mechanics, be easily broken by bending of the package, and even more easily by twisting than if said bonds were located outwardly from the center.

Referring to Figure 16, the separators 76 have tabs 94 on three sides, which are shown flat, but in use are bent up along bend lines 93. Referring to Figure 15, it will be seen that separators are located at the point of an outward fold of the sides 71, 72, 73 and 74, and are secured by cementing tabs 94 to side walls 72, 73 and 74, there being no tab provided on the side 71, which is the side carrying the splice and which being last closed in the process of manufacture, prevents access to readily accomplish a bond at this point.

While not illustrated, it is within the scope of my invention to include any other combinations of holes and/or slits in said diaphragms 76 which might be used to accomplish the aforementioned purposes.

The vertical cells 48 further comprise a bottom diaphragm 75 which is preferably of heavier material than that used for the sides, and is a simple square in shape.

The vertical cells 48 still further comprise a portion of sides 71, 72, 73 and 74 which extend downwardly beyond the last accordion-like fold in said sides, at which last fold the bottom diaphragm is inserted, and said extended portions are folded over in the usual manner used by store clerks in wrapping a prismatic package. This is illustrated in Figure 17. These folded portions are bonded to said diaphragm 75 by adhesive, wax, or other bonding agents as the case may be, with particular care to assure a complete sealing against leakage.

The vertical cells 48 still further comprise extensions of sides 71, 72, 73 and 74 upwardly beyond the last accordion-like fold, which extensions form tabs 95 (Figure 12). These tabs 95 are wrapped upward onto the top 66 and cemented or otherwise bonded to said top. Those tabs which do not fall adjacent to an outside edge of top 66 may be simply eliminated since there is no particular need for a water-tight construction at this point because the packages should not be filled completely to overflow with water.

The bottom tie sheet 77 is a channel-like piece which has as its principal function the tying together of the bottoms of the several cells. Said bottom tie may be securely bonded as extra protection against leakage. Its upstanding flange portions could be extended up the entire side of the package for the purpose of carrying an advertising message, in which case it would follow the folds of the sides and thus form a double wall on two sides of the package unit.

Having thus described one embodiment of the package unit, it should be understood that the broad conception of my invention is not restricted to the specific construction shown, other forms having occurred to me as they will to others skilled in the art.

A large quantity of the above described packages in collapsed form may be stored within the machine in a magazine or rack F. Referring to Figure 2, it will be seen that an access door 96 is located in side wall 16 near the upper end of magazine F. Through this access door packages may be inserted in the magazine by forcing down the remaining supply of packages and placing more packages on top of the remaining supply. Essentially, the magazine or rack consists of rail-like members (refer to Figure 10) 97, 98, 99, and 100, arranged to confine and guide the four corners of the package units 51; a package follower carriage 101 supported by a cable 102 which is passed over a pulley 103, and attached to a counter-balancing weight 104. Weight 104 travels in a channel-like portion of rail member 99. The magazine assembly is secured at its lower end to horizontal wall 20 by means of angles 108 (Figures 2 and 26). Package follower carriage 101 has upturned flanges 107 on which are mounted rollers 106 which roll upon track-like projections 105 of rail members 98 and 99. Cable 102 is attached to the carriage 101 by means of a fitting 109. Pulley 103 is rotatably mounted on a bracket 110 supported from rail member 99. It will be apparent that the column of stored packages is constantly forced upward by the force of the weight 104. In Figure 7 it will be seen that the topmost package is stopped from further travel by flange 111 of the feed guide rail 112. Thus, there is always a package in position to be transferred to the freezing chamber, as will be described later, so long as the supply lasts.

The refrigerating means comprises the evaporator coils 113 (Figure 3) which encircle the freezing compartment G and which are connected to a conventional refrigerating apparatus J located in the bottom of the housing on the base 19, and this refrigerating apparatus may include the usual compressor 114, expansion valve and condenser 115. Air for condensing purposes enters through louvres 116 in the back wall 14 and passes through the condenser 115 and out through the louvres 117 in side wall 17. The compressor of the refrigerating apparatus may be thermostatically controlled in a conventional manner for maintaining the desired refrigerating temperatures at the freezing chamber.

The remaining parts of the machine will be described as they are brought into use in the operation of the machine.

For the purpose of describing the operation of the machine, we will assume that the machine has been in normal operation, and that the storage conveyor is completely filled with packages of frozen ice cubes, and that a completely frozen package is in the freezing compartment.

A customer desiring to purchase a package of ice cubes deposits a coin or coins in the coin slot 118, from which it is received into the coin mechanism 119. This coin mechanism may be of conventional design and may have all the usual testing and rejecting features usual to such mechanisms, as well as the more recently developed change-making features as desired. If the coin is defective in any way, it will be returned through the coin return chute 120. If the coin is accepted, it causes a switch 121 (see Figure 21) to be closed, thus completing the circuit of the package release motor 122 (Figures 2 and 21), causing it to start and drive through a complete release cycle. This motor is a gear-reduction type whose output shaft 123 (see Figures 27 and 28) is journalled in an internal wall 124. This wall merely supports various parts of the mechanism, and has openings to allow cooling of the storage compartment H by circulating air from the area around the evaporator coils. Rigidly mounted to the shaft 123 is a plate cam 125 having a continuous cam groove 126 cut in one face of said cam. A pin 127 is slidably engaged in said cam groove and restricted to substantially radial movement with relation to shaft 123 by means of link bar 128 on which said pin is mounted, restraining rollers 129 rotatably mounted on wall 124, and pin 130 whose movement must be arcuate since it is also connected to crank arm 131. Figures 27 and 28 have been drawn to show the aforementioned parts in the positions they have assumed after approximately 60° of rotation of the cam 125 from its position of rest between release cycles. Thus it will be seen that pin 127 must have traveled inwardly toward shaft 123 from the outermost part of cam groove 126 to its illustrated position. In so doing, it has caused crank arm 131 to rotate from its position shown in dotted lines to the position shown in solid lines. Crank arm 131 is rigidly attached to shaft 132, which is journalled in brackets 133. Likewise rigidly attached to shaft 132 are ribs 134 mounted on the curved door 135. Thus it will be seen that approximately the first 60° of rotation of cam 125 has caused the rotation of shaft 132 which carries the door 135, and has opened said door preparatory to releasing a package of ice cubes from the storage conveyor. This door 135, when closed, forms a part of the wall of the storage compartment in which the conveyor operates.

In Figure 27 may be seen a package of ice cubes resting on conveyor tray 136 ready to be released by rotating said tray downwardly to approximately the position illustrated by dotted lines.

This release is accomplished by the further rotation of cam 125. Projecting from the face of cam 125 opposite the face in which groove 126 is cut, is a crank pin 137 which, during the first 60° of rotation of cam 125, has idled in slot 138 of link 139. At this point pin 137 has reached the lower end of slot 138 and starts to pull on link 139 whose other end is attached by pin 140 to a crank member 141. Crank 141 is shown broken away in Figure 27 to reveal other important parts. Crank 141 is rigidly attached to shaft 142 which is journalled in lug 143 projecting from idler 144. Idler 144 is essentially a heavy tubular member idling on the main conveyor shaft 145 and having two projecting lugs 143 and 146, a projecting cam 147 and a projecting stop 174.

Also rigidly attached to the shaft 142 is a tray release arm 148. Crank 141 carries a tray depressor pin 149. Tray release arm 148 and tray depressor pin 149 will be seen in Figure 28 to be normally in clearance relationship to all the parts of the package conveyor which, under other conditions of operation to be described hereafter, must be free to travel within the storage compartment H.

During the first part of the movement of link 139, crank 141 is caused to rotate about the center of shaft 142, turning said shaft in its journal and consequently rotating arm 148 also. This movement is opposed by the torsion spring 150 which is coiled on shaft 151 connecting an extending portion of crank 141 and the conveyor advancing pawl 152. The ends of torsion spring 150 are so arranged as to tend to rotate pawl 152 in a clockwise direction about shaft 151, but which rotation is prevented by the cam follower pin 153 which rests against the cam 147. It will be apparent that under the influence of the spring 150 and the reaction of the cam follower pin 153 on its cam, the crank 141 will also have a tendency to rotate counter-clockwise about its shaft 142. Movement in this direction is stopped when arm 148 rests against the body portion of idler 144, as illustrated in Figure 27. It also will be evident that the entire assembly of idler 144, pawl 152, crank 141, arm 148 and their attached parts would be free to rotate about shaft 145 except that it is restrained from doing so by the spring 154 which has one end attached to the structure of the cabinet by appropriate means, and its other end attached to pin 155 on the vertically extending lug 146. The relative strength of springs 150 and 154 are such that no extension of spring 154 will take place under the influence of spring 150 alone. Spring 154 will be overpowered only when pawl 152 has engaged the teeth of ratchet 156, and the cam follower pin 153 rests against stop lug 174.

The aforementioned first part of travel of arm 148 brings said arm into latch tripping relationship with the tray latch 157 which has an inclined cam surface 158 at its outer end, a heavy, angularly disposed portion 159, a projecting catch 160, and a thin spring-like portion 161. The end of advancing arm 148 engages the inclined surface 158 and further travel forces the latch 157 to bend in its spring-like portion 161, moving the heavy angularly disposed portion toward wall 124, and with it the projecting catch 160 which is lifted out of engagement with the latch opening 162 in conveyor chain link 163.

Up to this point, the conveyor tray 136 has been supported in a substantially horizontal position by the tray latch 157 which is attached to an upstanding flange 164 of said tray. Without the restraint of the projecting catch 160 engaged in the latch opening 162, the tray is free to rotate about its hinge pin 165 which is journalled in a projecting arm of the L shaped chain link 163 except for the slight restraint of the tray re-latching torsion spring 166. On release of the latch, the tray may pivot about hinge pin 165 under the influence of the weight of the frozen package 51, since the tray re-latching spring is not heavy enough to support this weight, thus dumping the package of ice cubes onto the curved delivery pan 167 on which it will slide by gravity to the delivery door 168. However, it is not deemed advisable to rely on a complete gravity dump of the tray 136, so a positive means of assuring that the tray will rotate downward and that the package will not adhere to tray 136 is provided.

By the time that arm 148 has released the latch, the rotation of crank 141 has advanced the tray depressor pin 149 to the first position shown by dotted lines, where it will contact an out-turned tab 169 projecting from tray flange 164. Further rotation of crank 141 will force the dumping action of tray 136 as heretofore described, and the continuing rotation of said crank will advance pin 149 to the second position shown by dotted lines. Due to the different centers of rotation of pin 149 and tab 169, they will attain a clearance relationship near this second position, and pin 149 will pass by the tab 169. To assure that the package will not adhere to the tray through freezing or other conditions, one or more ejector bars 170 (Figures 29 and 28) may be provided. Ejector bar 170 comprises a bar-like member having bosses 171 and 172, the end of which is rounded or downwardly bent to prevent damage to the package. Referring to Figure 29, it will be seen that when tray 136 is rotated to dumping position, the ejector bar 170 remains substantially horizontal since it is mounted on hinge pins 165 and 173. The relative movement of the tray and ejector bar exerts a prying action on package 51 and any bond between the package and the tray will be broken and the package will slide out.

With the weight off of the tray and the tray depressor pin clear of the tab 169, the tray will be snapped back to the horizontal position by the tray re-latching spring 166. In this return action, the angularly disposed portion 159 of the latch 157 will act as a cam in relation to the edge of link 163 and cause the projecting catch 160 to ride over and drop into the latch opening 162, securely re-latching the tray.

With the package delivered into the receiving compartment I, the customer may raise the door 168 and receive the package. However, the release cycle is not completed since the machine must be prepared to deliver another package. Therefore, the mechanism is so designed that the further rotation of cam 125 and further rotation of crank 141, will advance the next tray into position for release. On said further rotation of crank 141 (crank pin 137 has not yet passed over center) the cam follower pin 153 reaches the shoulder of the cam 147, and passing over the shoulder, allows the pawl to engage the teeth on ratchet 156. Said teeth are so spaced and the rotation of the pawl is so designed as to advance the package conveyor one space. A conventional detent mechanism may be provided at any suitable location to more accurately position the conveyor and restrain it against accidental movement due to unbalanced weight in the conveyor, the tendency to move when a tray is being forced down, etc. When pawl 152 engages the ratchet, cam follower pin 153 has dropped off the shoulder of cam 147 and bears against stop 174 on idler 144, causing the entire idler, together with the attached cranks, etc., to turn as a unit on shaft 145. This is necessary to prevent pawl 152 from lifting out of the teeth of the ratchet and give the mechanism sufficient rotational travel to accomplish the advancement of the conveyor.

At this point in the operation, crank pin 137 passes over center, and the continuing rotation of cam 125 allows the return of the various tray releasing and conveyor advancing parts to their former positions under the influence of springs 154 and 150. The return rotation of idler 144 is stopped by stop 175 attached to the cabinet structure. The previously mentioned detent mechanism restrains the conveyor from backward travel sufficiently to overcome the drag of the pawl 152 over the inclined ratchet teeth.

After the cam 125 has been rotated approximately 260° clockwise from the position shown in Figure 27, the link 139 will reach a position where crank pin 137 will again idle in slot 138. At the same time, cam lobe 176 on the periphery of cam 125 will be approaching the push rod 177. The further travel of cam 125 will cause the cam lobe 176 to displace the push rod 177. Push rod 177 may be made to actuate a suitable switch for breaking the electrical circuit to motor 122, thus completing the release cycle. Over-travel of the motor will carry the cam lobe 176 far enough to allow push rod 177 to return to its normal position. Cam groove 126 may be designed to close door 135 at any desired stage of the release cycle and assure that it is closed at the beginning and end of the cycle.

There is now an empty tray in the conveyor. It is necessary that this empty space be filled automatically, regardless of the fact that several vacancies may exist in the conveyor at any one time, as will be seen later. I have therefore provided a selector mechanism K which accomplishes this. Figure 21 shows this mechanism in semischematic form in conjunction with a basic wiring diagram. I have adapted and improved upon the structures of Patent 2,096,620 issued to J. A. Robertson to suit my purposes, omitting certain parts employed by Robertson and adding others of my own. To shorten the description herein, I have used certain characters to designate the parts adapted from 2,096,620 which are identical to the characters of said patent. Thus, characters 13, 15, 31, 32, 33, 34, 38, 39, 40, 42, 44, 45, 46, 47, 49, 50, 52, 53, 55, 56, 58, 60, 67, 68 and 70 of Figure 21 indicate parts having the same character and function as in 2,096,620. An understanding of the function of these parts is assumed to have been made clear by Robertson.

It will be evident that I have not employed any of the parts of 2,096,620 which are clock parts but am only using those of the switch. I provide a setting pin 13 for each conveyor tray. I have additionally provided a remotely controlled setting means, a coordinating means between the conveyor trays and the setting pins associated with each tray, a master switching means, and a remotely controlled cancelling means.

The coordinating means between the conveyor trays and the setting pins comprises a sprocket 178 (Figure 1) mounted on the upper conveyor shaft 180, a drive chain 179, a selector drive sprocket 181 (Figure 21) mounted on the selector drive shaft 182 which is journalled in wall 21, a setting arm 183, and a cancelling arm 184. Selector drive shaft 182 is shown broken and both the setting and the cancelling arms are shown in a position to act on the same setting pin 13 to simplify the illustration, whereas actually arm 183 and arm 184 have a radially offset fixed relationship to each other corresponding to the offset in the conveyor itself between the release position and the loading position.

The diameters of sprockets 178 and 181 are such that one complete revolution of the entire conveyor causes one exact revolution of selector shaft 182.

Thus setting arm 183 will always be opposite the same setting pin when the tray corresponding to that pin is at the release position. Likewise, the cancelling arm 184 will always be in position to operate this same pin when said tray is at the loading position.

The multiplicity of setting pins in the actual selector switch has been eliminated in Figure 21, which only shows those falling in the plane of the drawing, and the rings 15, 185 and 186 have been cut away as in a section for greater clarity.

The remotely controlled setting means comprises the push rod 177 (Figures 27 and 1), a crank 187, a flexible cable 188, and a crank 189. The push rod pushes on crank 187, which is pivotally mounted to wall 124 thereby pulling on flexible cable 188, the upper end of which is attached to crank 189. Crank 189 is pivotally mounted to the rigid structure supporting the selector switch by a pin 190, and has a projecting lug 191 which engages a groove 192 in the setting arm 183. Setting arm 183 is keyed to slide axially along shaft 182 opposed by spring 193. Thus, the completion of the package release cycle is arranged to actuate the setting arm 183, which in its axial movement will push setting pin 13 to its set position, and be then returned by spring 193 to its normal position, where it can be free to rotate without interfering with other setting pins.

The master switching means comprises a pair of electrically conductive ring-like plates 185 and 186 similar to rings 15 but mounted on insulating bushings 194 carried by a number of supporting rods 195 which together with various lengths of tubular spacers 196 form the supporting structure for all the aforementioned rings and other parts of the selector mechanism; and a number of bar-like switch pins 197 equal in number to the number of setting pins 13 and attached to said setting pins and having an insulating portion 198, an electrically conducting portion 199, and a second insulating portion 200 arranged in sequence along its length. These switch pins operate slidably in slots 201 of rings 185 and 186 and when in the position shown in Figure 21, portion 198 provides a support for the switch pin and electrically insulates plate 185 and 186. Portion 200 electrically insulates the switch pins and said plates from the rest of the selector switch mechanism.

When setting pin 13 is set to actuate the switching arrangement of Patent 2,096,620, switch pins 197, being attached to pins 13, are also moved into such a position that the electrically conductive portion 199 provides a path for the flow of electricity from plate 185 to 186. In other words, setting a pin 13 closes the master switch and setting of additional pins 13 has no electrical effect, the master switch being closed as long as one or more setting pins are in "set" position.

The remotely controlled cancelling means comprises a cancelling arm 184 similar in construction and operation to the setting arm 183 already described, which is operated by a system of cranks, rods and levers which will be described more fully later.

In our sequence of operations thus far described, we have completed the release of a package, and in so doing, have actuated the setting arm 183 pushing the setting pin 13 and its attached switch pin to "set" position. The pin 13 which has been set is so related to the roller 53 that said roller will reach pin 13 and actuate the switch cam 38 at the proper time to stop the conveyor for loading the empty tray which was indicated when that particular pin was set. Setting the above described switch pin completes three circuits; one starts the conveyor drive motor, the second opens relay 203 preventing the operation of the release motor 122, and the third illuminates the warning "Wait" signal to indicate that the release motor cannot be made to operate. These circuits may be traced on the diagram of Figure 21 as follows: First, from one side of the power line 204 to plate 185 to switch pin conductor 199 to plate 186 to conveyor drive motor 202 through the normally closed contacts of relay 206 to the other side of the power line 205; Second, as above to plate 186 and thence to the operating coil of relay 203 and through the normally closed contacts of relay 206 to line 205; Third, wait signal 207 is wired in parallel with the operating coil of relay 203 and thus indicates whenever this relay is energized.

The conveyor drive motor 202 drives the conveyor through worm gear 208 on the upper conveyor shaft, turning it in a counter-clockwise direction as viewed in Figure 1, and advancing the empty tray toward the loading position at the bottom center of the conveyor opposite the opening of the delivery chute 11. The shaft 182 of the selector mechanism is rotated by the chain drive previously described, carrying with it the roller 53 and driving the cam wheel 70 through the associated gearing 33, etc. When the conveyor has moved the empty tray to the proper position for loading said tray, the roller 53 and cam wheel 70 will have reached the proper position to actuate the switch cam as described in Patent 2,096,620, closing contacts 40 and thus completing the circuit from line 204 through said contacts 40 to the energizing coil of relay 206 and thence to line 205.

The energizing of relay 206 opens the normally closed contacts of said relay, breaking the circuit of the conveyor drive motor 202, and stopping the conveyor with the empty tray in loading position. This relay may be equipped with a dash pot 209 to slow its action and allow a limited time interval before closing the other sets of contacts shown. This short time interval will allow the coin operated switch 121 to gain control at this point to deliver another package if desired. This is accomplished by the fact that relay 203 was held open by having its energizing coil connected through the contacts of relay 206 and while relay 206 is momentarily between contacts, relay 203 will momentarily close, and in so doing, not only completes the release motor circuit (if coin operated switch is closed), but also energizes the coil of relay 210 which opens the line 205 (beyond the connection of the coin operated switch 121) and prevents the driving of any other motor than the release motor.

If the coin operated switch is not closed, or when another package release is completed and said switch is then re-opened, the relay 206 will then close its normally open contacts. This again completes the release motor lock-out and warning signal circuits through the newly closed alternate contacts of relay 206.

With the closing of the normally open contacts of relay 206, the package re-loading cycle is started. It will be seen that the circuit of the re-loading cycle motor 211 is closed from line 204 through contacts 40 thence through motor 211 to the second set of contacts of relay 206 now closed, and thence to line 205.

Referring to Figures 2 and 26, it will be seen that the package re-loading motor 211 is arranged to carry a series of cams upon its driveshaft 212, which cams actuate a series of push rods and tension rods that act in sequence on mechanisms which release a frozen package, reload the freezing chamber with an empty package, fill the package with water, and lastly, cancels the setting of the setting pin corresponding to the conveyor tray which has just been filled.

The motor 211 is a geared type motor having a very slow speed output shaft, as are motors 202 and 122.

The package re-loading motor 211 has its shaft journalled in a rocker arm support bracket 213 (Figure 26) which together with rocker arm bracket 214 supports the rocker arm shaft 215 on which are pivotally mounted three rocker arms 216, 217 and 218, each having a cam following roller 219 at one end, and having its other end attached to a push rod or tension rod.

In Figures 22, 23, 24 and 25 the various cams are shown in their positions at the start of the re-loading cycle. The package dumping cam 220 is the first cam to come into action on the start of motor 211; rotating in the direction shown by the arrow of Figure 23. Cam 220 depresses rocker arm 217, which is pivoted on shaft 215, thereby pushing on push rod 221, which is pivotally connected to said rocker arm, causing said push rod to act at its upper end on arms 222 (Figure 3) which are formed of extended portions of ribs 223, supporting door 224, which forms the bottom plate of the freezing chamber. Arms 222 are rigidly attached to shaft 225 which is journalled in extending lugs 226 and 227, which are integral with side plates 228 and 229 of the freezing chamber. The freezing chamber consists principally of a vertically extending tube, rectangular in cross section, having four walls comprising side walls 228 and 229 and end walls 230 and 222 within which a movable side wall 223 and a movable end wall 234 form an inner chamber, closed at its lower end by door 224, said inner chamber being adapted to so closely fit an extended package 51 as to support the walls and bottom of said package when filled with water to be frozen. The movable side wall 233 and the movable end wall 234 are urged inwardly by a number of springs 235 but restrained by the U-shaped brackets which pass through the outer walls 229 and 232 and encircle cam plates 237 and 238. In Figure 20 the movable plates are shown in their closed or inner-most position. Their outward movement to release a package is controlled by the cam plates 237 and 238, which by upward movement from the position shown, causes the inclined surfaces 239 to act as a wedge between the wall plates 229 and 232 and the respective U-shaped brackets 236, thus forcing the movable plates outward against the springs 235.

Going back to the action of the push rod 221 which rotates the bottom door 224 about the shaft 225, it will be seen in Figure 3 that the shaft 225 is arranged to effect the above mentioned upward movement of the package releasing cam plates 237 and 238 through a system of cranks and a connecting cam link. Shaft 225, turning in its journals, causes the rotation of crank 240, which is rigidly attached to said shaft 225. A cam link 241 is pivotally connected between crank 240 and a second crank 242. Link 241 has a cam surface 243 arranged to force the upward movement of cam plate 237 through the contact with a roller 244 rotatably mounted on said cam plate 237. Undue bending of link 241 may be prevented by a reacting roller 245 rotatably mounted on wall 229 of the freezing chamber, which maintains contact with an arcuate portion 246 of link 241 which is so designed as to maintain said contact during the arcuate movement of link 241 when its pivoted ends follow the circular paths of rotation of the pivot connections to cranks 240 and 242. Crank 242 is rigidly attached to a crank shaft 247 which is journalled in extending lugs 248 and 249 integral with said walls 228 and 229.

Carried on and rigidly attached to crank shaft 247 are a pair of identical crank arms 250 between which a rotatably mounted roller 251 is mounted at the outer ends of said crank arms 250. This roller 251 rolls along the horizontal lower edge 252 of cam plate 238 when crank shaft 247 is turned in its journals, thereby forcing the upward displacement of the cam plate 238. The upward displacement of cam plates 237 and 238 is opposed by springs 253 attached at one end to said cam plates and at the other end to the outer walls of the freezing chamber, said springs also acting to return the cam plates and lever system to their normal positions when cam 229 (Figure 23) passes over center and allows such return.

When the bottom door 224 and movable freezing chamber walls 233 and 234 are in their closed position, and a package of ice cubes is contained within the freezing chamber, the top of said package is retained by means of the engagement of the overhanging guide lip 69 in the recess 254 (Figures 8 and 9), the flange 255 preventing the top of the package from dropping downwardly in the freezing chamber.

In Figure 9, it will be seen that a portion of the package feed guide rail 112 is attached by welding or other suitable means to the movable side wall 233 of the freezing chamber, said feed guide rail being discontinuous at the point 255 (Figure 3). On the opposite wall 228 a feed guide rail 112 is similarly attached, but remains stationary during the package dumping action. When the freezing chamber is opened as previously described, the side wall 233 being moved in the direction indicated by the arrow in Figure 9, the portion of the feed guide rail 112 attached thereto will disengage the guide lip 69 of the package and the package will be allowed to fall from the freezing chamber. Positive ejecting means may be readily provided through the side walls or guide rails to assure that the package will fall out of the freezing chamber.

The package falls into the chute 11 and is guided into the empty tray space at the bottom of the storage conveyor.

The further rotation of cam 220 causes the closing of the freezing chamber by the return springs 253. Additional return springs at other points in the release system described may be provided if desired.

The continuing rotation of the shaft 212 (Figure 26) brings cam 256 into position to displace rocker arm 216, which is arranged to pull downwardly on rod 257 pivotally connected at its upper end to crank arm 258, which is pivoted on a stud 265 secured in plate 264 mounted on the package guide rails 97 and 100. A spacer 266 is provided to properly align crank 258 with connecting link 259 which is pivotally connected at one end to said crank 258 and its other end to link 262. Link 262 has a projecting pin 261 at its lower end which engages slot 260 cut in plate 264. The upper end of link 262 is pivotally connected to the down-turned flange 267 of the package loading slide 268. The linkage comprised by crank 258, link 259, link 262, and slot 260 allows the pivoted upper end of link 262 to exert a horizontal force on the package loading slide, and allows a linear motion of the slide when crank 258 is rotated, the position of the linkage at the end of its travel being shown by dotted lines. A return spring 263 is provided to return the slide 268 and its connecting linkage, one end of said spring being connected to crank 258 and the other to plate 264.

Referring to Figure 6, the package loading slide will be seen to be a plate-like member having downwardly and inwardly turned flanges 269 (see Figure 7) along its sides designed to engage the out-turned flange 270 of the guide rails 112, having the downturned flange 267, having the rolled-over projections 271 which encircle hinge pin 272, and having its center portion cut away to form a U-shaped outline 273, which allows the slide to straddle the water inlet tubes 65 when over the freezing chamber. Hingedly attached to the package loading slide is a package push plate 274 having hinge pin encircling extensions 275, and an upwardly extending arcuate portion 276 which acts as a stop against the rotation of the package push plate by abutting against the slide 268. A light torsion spring 277 encircles the hinge pin 272 and tends to rotate the package push plate in the clockwise direction as viewed in Figure 11, which rotation is stopped by the projection 276 when the push plate is substantially vertical.

In Figure 3 and 4 the package loading slide and its package push plate are shown at the beginning of the stroke which loads a package into the freezing chamber, the push plate 274 extending downwardly beyond the top of the uppermost package in the package storage rack, so that when slide 268 moves along the package guide rails 112, the uppermost package is forced to slide off the top of the stack of packages, its projecting tabs 69 being guided in the grooves 254. As the package slides toward the freezing chamber, a support plate 278 (Figures 3 and 8) prevents any dropping of the bottom of the package due to opening of the folds of the package until it has passed completely into place in the freezing chamber, where the package filling holes 79 now fall directly under the water inlet tubes 65. Because of the compressed condition of the package to this point, there is a tendency for the packages to partially unfold and expand, and the package is now free to expand downwardly into the freezing chamber.

When the package loading cam 256 passes over center, the return spring 263 starts the reverse motion of the package loading slide and its connecting linkage. When the uppermost package in the storage rack was removed, the entire column of packages was moved up by the weight 104, thus bringing another package into position for loading.

It will be apparent that in the return of the package loading slide, the package push plate 274 will strike the uppermost package in the rack. The hinged arrangement shown in Figure 11 allows the package push plate to deflect against the action of spring 277 and ride up over the top of the package, dropping down again after passing over the package, and thus being in position to push the next package into the freezing chamber. Enough over-travel of the slide and linkage is provided to allow said push plate to pass completely over the package.

The next cam which comes into action as the shaft 212 continues its rotation, is the package filling valve cam 279 which is designed to open the valve quickly and allow it to remain open for the required period to fill the packages with water, as was previously described. This cam is connected to the valve slide 59 (Figure 19) by means of a crank 280 (Figure 2) and a tension rod connecting said crank to the rocker arm 218 in the same manner as tension rod 257 was connected.

With the valve open, the measured quantities of water flow into the package cells through the tubes 65. The weight of the incoming water will cause the package to fully extend until the bottom of the package rests on the door 224 and the package sides rest against the walls 228, 230, 233 and 234, which supports them against the pressure of the water contained in the package. The package of water immediately starts to freeze to ice because of the intense cold produced by the coil 113 encircling the freezing chamber.

The freezing of water in the inlet tubes 65 may be prevented by a thermostatically controlled electrical heater element 281 (Figure 3) installed in heat conducting relationship to said inlet tubes, and suitably arranged thermal insulation around said heater, tubes, and water system parts.

The completion of the re-load cycle occurs when the shaft 212 (Figure 26) has completed one revolution, and cam 282 has displaced the flexible push rod 283 of the type having an outer confining casing and an inner flexible shaft. The outer casing is clamped to rocker arm bracket 213 by a clamp 284. The upper end of the push rod 283 operates a bell crank 285 (Figure 2) which is in turn connected to a link 286 which passes through wall 21 and connects to a lever 287 pivoted on a bracket 288 mounted on said wall. The other end of lever 287 engages the groove 289 of the cancelling arm 184 in the selector switch K.

The displacement of the push rod by cam 282 will thus be seen to cause the cancellation of the setting of the switch pin 197 and connected setting pin 13.

Cancelling the setting of pin 13 will allow roller 53 to effect the operation of escapement 46. In the arrangement of Figure 2, Patent No. 2,096,620, the operation of escapement 46 will not alone release the switch cam, but escapement wheel 45 must also be released. Since there has been no movement of shaft 182 since the switch was previously operated, then escapement wheel 45 must still be unrestrained by pawl lever 67, and the operation of escapement 46 will allow the rotation of the switch cam opening contacts 40. The opening of contacts 40 de-energizes the relay 206, stopping the drive of the re-loading cycle motor 211.

The circuit from plate 185 to 186 has likewise been broken if only one switch pin has been set.

Thus, if only one package has been released from the machine, all the automatic cycles have been completed, the conveyor is again full, and the machine is at rest except for the freezing process on the package just re-loaded into the freezing chamber.

However, if two or more packages have been released, then all the switch pins 197 connecting plates 186 and 187 will not have been cancelled, and the opening of the contacts 40 would switch back to the previously described circuit, which drives the conveyor on to bring the next empty tray to the loading position. Since there is not now a frozen package in the freezing chamber available for filling this tray, it is necessary to delay this further automatic action until the package just filled with water is frozen.

For this purpose a thermally operated switch is provided in the line 205 which, when open, prevents the operation of all motors except the release motor 122. This thermal switch is located at the freezing chamber in heat conducting relationship with the package of water or ice cubes, and so designed as to detect the temperature of the package contents and operating to open the circuit when said contents are not completely frozen. To increase the producing capacity of the machine, the temperatures used for freezing may be extremely low, and thus a high temperature gradient will exist between the freezing coils 113 and the central unfrozen core of water in the package. Thus, the coils may be at sub-zero temperature and the unfrozen core will be at approximately 32° F., with the surface of the package at an intermediate temperature. When freezing is completed, the ice will continue to drop in temperature and the temperature gradient will tend to disappear. Thus, with the control set to close only at extremely low temperature, the premature release of a package may be prevented.

An alternate means of control may be provided by replacing the thermal switch with an interval timer which may be set to start a time interval each time a loading of the freezing chamber takes place, and close the line circuit only after such timed interval has elapsed.

When the freezing of the water in the package is completed as determined above, the thermal or time switch 290 will close and allow the repetition of the previously described cycles until the conveyor is completely filled and the last switch pin has been cancelled.

Thus it will be seen that I have provided a machine which requires only infrequent servicing, with a supply of compact package units, and which is capable of meeting a high rate of demand at certain hours of the day because of the reserve supply contained in the conveyor. The supply of ice available for delivery to the customers is not limited by the immediate rate of production of the freezing chamber, the machine continuing to build up its reserve during off-peak demand hours, and working twenty-four hours a day.

The latest developments of automatic defrosting techniques may be incorporated in the refrigeration system.

The ice producing capacity of the machine may be readily increased by the addition of more units consisting of a complete package storage racking freezing unit, arranged to feed all the dumped packages into an expanded hopper-like opening at the top of the chute 11 and arranged to release their frozen packages in sequence.

The character 291 designates the sprocket wheels attached to the conveyor shafts 145 and 180, which, with said shafts and endless chain links 163 and 292, hinge pins 173 and 165, comprise the endless chain system carrying the trays 136, and referred to in this specification as the conveyor.

It will now be noted that my invention provides the advantages and results as described herein, and as set forth in the various objects mentioned heretofore.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. An ice cube vending machine comprising an outer casing, a chamber in said casing, a plurality of normally collapsed foldable containers in said chamber, means for advancing said containers to a water filling position, whereby said containers will be expanded, refrigerating means for freezing the water in said containers into ice cubes, means for automatically discharging said containers containing said ice cubes thus formed in sequential relation, said water filling means including a plurality of compartments each of which includes a measured water supply consistent with the capacity of each part of said containers, said containers having openings therein wherein said water will flow.

2. An ice cube vending machine comprising an outer casing, a chamber in said casing, a plurality of normally collapsed foldable containers in said chamber, means for advancing said containers to a water filling position, whereby said containers will be expanded, refrigerating means for freezing the water in said containers into ice cubes, means for automatically discharging said containers containing said ice cubes thus formed in sequential relation, said water filling means including a plurality of compartments each of which includes a measured water supply consistent with the capacity of each part of said containers, said containers having openings therein wherein said water will flow, means for regulating the time and period of flow of said water into said containers.

3. An ice cube vending machine comprising an outer casing, a chamber in said casing, a plurality of normally collapsed foldable containers in said chamber, means for advancing said containers to a water filling position, whereby said containers will be expanded, refrigerating means for freezing the water in said containers into ice cubes, means for automatically discharging said containers containing said ice cubes thus formed in sequential relation, said water filling means including a plurality of compartments each of which includes a measured water supply consistent with the capacity of each part of said containers, said containers having openings therein wherein said water will flow, means for regulating the time and period of flow of said water into said containers, said casing having a passageway including a plurality of conveyor trays upon which said containers rest, means for moving said trays into discharging position.

ROBERT H. RIDNOUR.

References Cited in the file of this patent
UNITED STATES PATENTS

| Number | Name | Date |
| --- | --- | --- |
| 1,231,569 | Coshland | July 3, 1917 |
| 1,956,991 | Lowen | May 1, 1934 |
| 1,960,456 | Robb | May 29, 1934 |
| 2,054,101 | Short | Sept. 15, 1936 |
| 2,064,655 | Geyer | Dec. 15, 1936 |
| 2,414,264 | Kirkpatrick | Jan. 14, 1947 |
| 2,415,451 | Synnestvedt | Feb. 11, 1947 |
| 2,431,916 | Caesar | Dec. 2, 1947 |
| 2,498,964 | Roethel | Feb. 28, 1950 |